Figure 1:
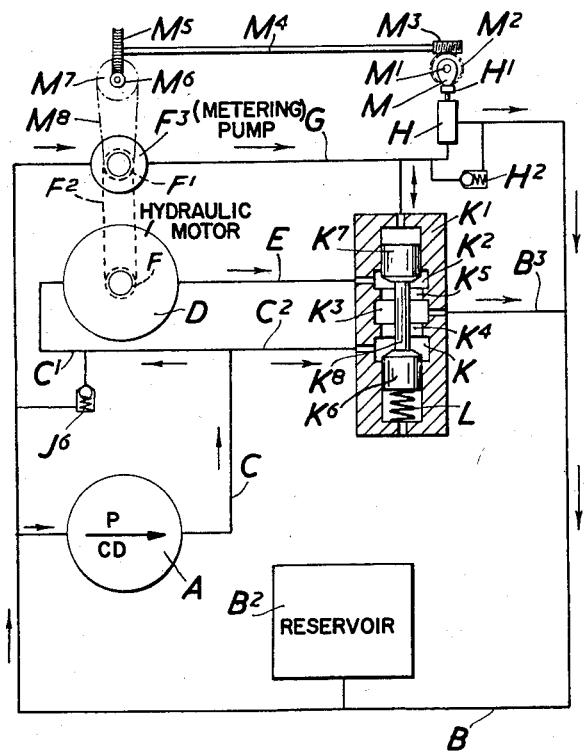

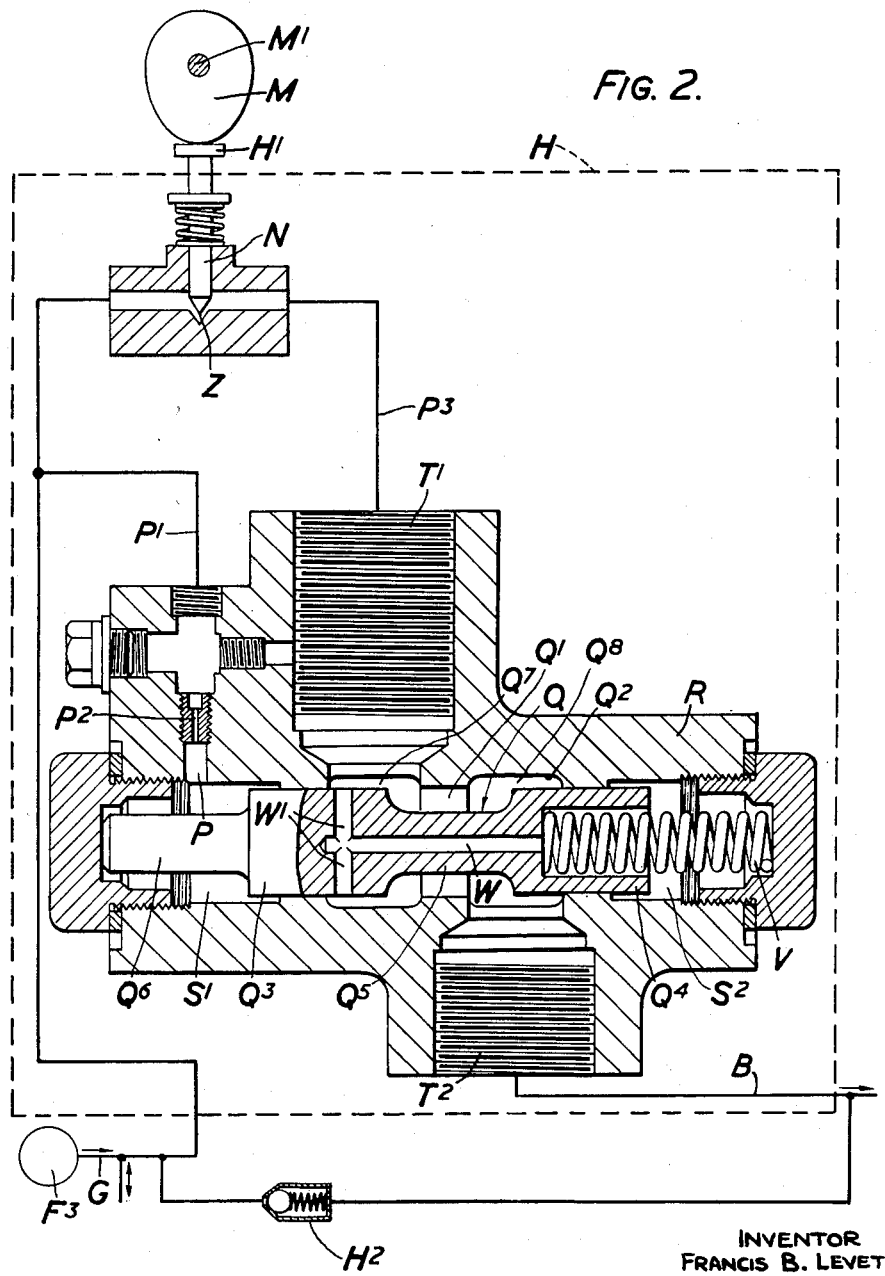

United States Patent Office 2,928,376
Patented Mar. 15, 1960

2,928,376

APPARATUS FOR THE SPEED OF REGULATION OF HYDRAULIC MOTORS

Francis Benjamin Levetus, Allesley, Coventry, England, assignor to The Keelavite Company Limited, Coventry, England, a company of Great Britain Application February 19, 1954, Serial No. 411,500

4 Claims. (Cl. 121—38)

This invention relates to apparatus for the speed regulation of displacement type hydraulic motors of the kind in which the speed of the motor has a substantially fixed relationship to the rate at which fluid passes through it, and has for its object to provide a simple form of apparatus by which the speed of such a hydraulic motor can be controlled, if necessary within fine limits.

According to the present invention apparatus for the speed regulation of a displacement type hydraulic motor comprises a metering pump driven through positive transmission mechanism by the motor and arranged to pump liquid into a chamber or passage (hereinafter called the control pressure passage), a control orifice device by which liquid can flow from the control pressure passage at a volumetric rate controlled by such orifice, and means responsive to the pressure in the control pressure passage for automatically controlling the rate of liquid flow through the hydraulic motor in accordance with the pressure in the control pressure passage to maintain the speed of the motor substantially in accordance with the flow through the control orifice.

By "positive transmission mechanism" is to be understood any mechanism or apparatus (including mechanism embodying a friction drive) by which the metering pump is driven at a speed having a determined, but not necessarily constant relationship to the speed of the hydraulic motor.

The cross-sectional area of the control orifice may be adjustable to enable the speed at which the motor is controlled to be varied, either manually, or automatically in accordance with some predetermined requirement.

In a simple arrangement the control orifice is a simple variable area orifice, the sensitivity of the pressure-responsive means to variations in the pressure in the control pressure passage being such as to ensure speed control of the motor within the required limits.

In other cases the control orifice device may be of a kind having associated therewith control means, of known type, for maintaining a constant pressure drop across such orifice so that for each setting of the device the rate of flow through it is substantially exactly maintained irrespective of pressure differences which may occur due to varying conditions on one side or the other of it, such known means comprising for example a flow control valve in series with a metering orifice and arranged to be responsive to the pressure respectively on the two sides of such metering orifice.

In any case a pressure relief valve may be provided to act as a safety valve by which fluid can escape from the control pressure circuit if the pressure therein exceeds some predetermined value above the normal.

The manner in which the pressure-responsive means control the rate of liquid flow to the hydraulic motor may vary but in one example where liquid is fed to the hydraulic motor from a constantly driven displacement pump the pressure-responsive means may comprise a pressure-responsive bleed valve of known type which controls the rate at which liquid is permitted to escape to exhaust from the pressure line by which liquid is fed to the hydraulic motor and thus varies the rate at which liquid is delivered to the motor.

The preferred arrangement where it is desired to control the speed of the hydraulic motor not only irrespective of the load upon it but also when reversals of torque occur so that the load tends to drive the motor, as for example where the load has substantial momentum and the setting of the control orifice is varied during operation to change the speed of the hydraulic motor, the pressure-responsive means may be arranged to control in opposite senses respectively the flow through the outlet passage from the motor and the bleed of working fluid from the passage by which the working fluid is delivered under pressure to the hydraulic motor. With this arrangement it will be seen that the pressure-responsive means can not only reduce the pressure at which working fluid is delivered to the motor so as to control the speed thereof when the motor is driving its load but can vary the back pressure existing on the outlet side of the motor and thus apply a braking force to the motor in order to control the speed if and when reversal of torque occurs and the load tries to drive the motor.

A suitable embodiment of the invention is illustrated diagrammatically in the accompanying drawings, in which Figure 1 shows an arrangement in which the speed of a hydraulic motor for driving the travelling bed of a machine tool, or other object having considerable momentum and subject to rapid changes in speed, is controlled irrespective of reversals of torque, and Figure 2 shows part-schematically the arrangement of the metering orifice device indicated at H in Figure 1.

In the illustrative embodiment of the apparatus, a pump A is arranged to be driven by a suitable source of power (not shown) at approximately constant speed and to draw hydraulic working fluid from a passage B communicating with a reservoir $B^2$ to ensure that it is always maintained full and deliver it to a delivery passage C, and a hydraulic motor D which is arranged to receive working fluid under pressure from an inlet passage $C^1$ communicating with the passage C while its outlet passage E is connected to the duplex control value $K'$ having two inlet chambers K and $K^2$. The hydraulic motor D is connected by positive driving mechanism comprising, for example, sprocket wheels F, $F^1$ and a chain $F^2$, to a pump $F^3$ of the metering type arranged to draw hydraulic fluid from the passage B and to deliver it to a passage G constituting the control pressure passage. The passage G communicates with the passage B through a metering orifice device H of well known kind (a typical arrangement being shown in Figure 2), constituting the control orifice and preferably including means by which the pressure drop across the orifice is maintained constant irrespective of the pressure at any time on its upstream side. The metering orifice device H is adjustable in known manner by means of a control member $H^1$ by which the effective cross-sectional area of its orifice can be varied at will.

Thus, referring to Figure 2, the metering orifice device H may comprise a needle valve N the effective opening Z of which constitutes the control orifice and is controlled by the control member $H^1$, the orifice Z being arranged in series with the orifice $Q^1$ of an automatic control valve Q located within a valve chamber $Q^2$ formed within the casing R of the valve Q.

The valve Q has two cylindrical enlarged portions $Q^3$ and $Q^4$ interconnected by a central portion $Q^5$ of lesser diameter which extends through the orifice $Q^1$, and the enlarged portion $Q^3$ merges into an end portion $Q^6$ which is also of lesser diameter.

At its opposite ends, the valve chamber $Q^2$ is enlarged in diameter to form two chambers $S^1$ and $S^2$ respectively, The chamber $S^1$ is connected, by way of a passage P formed in the casing R and an external passage $P^1$, to one side of the control orifice Z and thence to the control pressure passage G and the pump $F^3$, a restriction $P^2$ being provided in the passage P.

The other side of the control orifice Z is connected by a passage $P^3$ to a port $T^1$ formed in the casing R, while a further, similar port $T^2$ formed in the casing R is connected to the passage B leading to the reservoir. The ports $T^1$ and $T^2$ communicate respectively with enlarged-diameter portions $Q^7$ and $Q^8$ of the valve chamber $Q^2$ in such a way that communication between the ports $T^1$ and $T^2$ takes place by way of the orifice $Q^1$ the effective opening of which is controlled by the central portion $Q^5$ of the control valve Q and is thus determined by the position of the valve Q.

The enlarged portion $Q^4$ of the valve Q is in the form of a cylindrical tube open at one end, and a helical spring V extends through the chamber $S^2$ and into the interior of the enlarged portion $Q^4$ in such a way as to tend to cause the control valve Q to move in the direction from the chamber $S^2$ to the chamber $S^1$ and so to enlarge the opening of the orifice $Q^1$.

A passage W extends through the central portion $Q^5$ of the control valve in an axial direction and communicates at one end with the interior of the enlarged portion $Q^4$, and so with the chamber $S^2$, and at the other end with a number of radial passages $W^1$ formed in the enlarged portion $Q^3$ of the control valve in such a way that the port $T^1$ is in constant communication with the chamber $S^2$.

It will thus be seen that the control valve Q is subjected at its opposite ends to the existing pressures at the opposite sides of the control orifice Z in such a way that it tends to maintain a constant pressure difference across the control orifice Z, the magnitude of the constant pressure difference being predetermined by the setting of the control member $H^1$ and by the spring constant of the helical spring V.

A relief valve $H^2$ is conveniently provided in parallel with the metering orifice device H and set to open at some predetermined pressure in excess of the normal working pressure in the control pressure passage G so as to act as a safety valve to prevent dangerous pressures from occurring under abnormal conditions. Moreover a relief valve $J^6$ may be provided between the passages $C^1$ and B and arranged to open at some predetermined pressure in excess of the normal maximum so as to prevent dangerous pressures from occurring in the passage $C^1$.

The passage C also communicates through the passage $C^2$ with one inlet chamber K within the casing of the duplex control valve $K^1$, the second inlet chamber $K^2$ being that with which the outlet passage E of the motor D communicates. Arranged within the valve casing $K^1$ between the two inlet chambers K and $K^2$ is an outlet chamber $K^3$ which communicates with the two inlet passages respectively through transfer ports $K^4$ and $K^5$. The ports $K^4$ and $K^5$ are controlled respectively by the end portions $K^6$ and $K^7$ of a piston-like valve member $K^8$ mounted to slide within the casing $K^1$ and acted upon at its lower end by a spring L and at its upper end by the pressure in the passage G.

The outlet chamber $K^3$ communicates by a passage $B^3$ with the passage B, and it will be seen that downward movement of the valve member $K^8$ simultaneously closes the port $K^5$ and opens the port $K^4$ and vice versa.

The metering orifice device H which controls communication between the passage G and the passage B has its control member $H^1$ acted upon by mechanism which varies the setting of the orifice progressively with rotation of the motor D. This mechanism is diagrammatically shown as a cam M mounted upon a shaft $M^1$ carrying a worm wheel $M^2$ with which meshes a worm $M^3$ upon a shaft $M^4$, the shaft $M^4$ carrying a second worm wheel $M^5$ which meshes with a worm $M^6$ arranged to be driven by a sprocket wheel $M^7$ through a chain $M^8$ from the shaft of the metering pump $F^3$. Thus the duplex control valve apparatus comprises both means for varying the volumetric rate at which the working fluid is permitted to escape from the working fluid supply passage $C^1$ and means for controlling the flow of working fluid through the outlet passage E from the hydraulic motor D, under the overriding control of the cam M and the metering orifice device H, whereby the duplex control valve $K^1$ exerts when actuated in one direction a strong braking force upon the hydraulic motor D by restricting its outlet passage E and simultaneously opening the bypass $C^2$ permitting escape of fluid from the working fluid supply, and by reversing these operations when actuated in the other direction it promotes flow of working fluid through the hydraulic motor D to maintain or increase its speed.

Such an arrangement will be suitable, for example, for driving and controlling the speed of movement of some member having limited travel such that it will complete its movement in one direction during rotation of the motor D to an extent sufficient to cause the cam M to move through, say, one revolution so that the cam by its control on the metering orifice device H controls the speed of the motor D in some desired manner throughout that movement, say so as to cause and control acceleration during the first part of the movement and deceleration during the last part of the movement.

It will moreover be seen that whether at any moment the motor is driving the load or the load by its momentum is attempting to drive the motor, the valve $K^8$ will move so as either to cause the motor to be driven with the required torque, or to have the appropriate braking torque applied to it by back pressure to maintain the appropriate speed, as may be necessary at any instant.

What I claim as my invention and desire to secure by Letters Patent is:

1. A prime mover system including in combination a displacement type hydraulic motor having inlet and outlet passages communicating with a source of supply of working fluid under pressure and apparatus for regulating the speed thereof, said apparatus comprising a control pressure passage, a metering pump driven directly by the motor and arranged to pump liquid into the control pressure passage, a control orifice device in communication with said control pressure passage by which liquid can flow therefrom at a volumetric rate determined by such orifice device, duplex valve apparatus having independent connections with said inlet passage and outlet passage and arranged to control jointly and in respectively opposite senses the escape of liquid from said inlet passage and from said outlet passage in inversely related volumes, and means responsive to changes in pressure in the control pressure passage operating simultaneously on the valve members of said duplex valve apparatus to control the volume of liquid flow through the hydraulic motor in accordance with fluctuations of pressure in said control pressure passage, thereby maintaining the speed of the motor substantially in accordance with the rate of flow through the control orifice.

2. A prime mover system as claimed in claim 1 in which said apparatus for regulating the speed thereof includes adjusting apparatus arranged to alter the setting of the control orifice device, and an operative connection between the hydraulic motor and said adjusting apparatus whereby the setting of the orifice device is automatically altered in response to the rotation of the hydraulic motor.

3. A prime mover system including in combination a displacement type hydraulic motor and apparatus for regulating the speed thereof, said apparatus comprising a control pressure passage, a metering pump driven directly by the motor and arranged to pump liquid into the control pressure passage, a control orifice device by which liquid can flow from the control pressure passage at a volumetric rate controlled by such orifice device, a working fluid supply passage by which working fluid is delivered to the hydraulic motor, a working fluid outlet passage by which working fluid flows from the hydraulic motor after passing therethrough, a working fluid relief passage, and control valve apparatus arranged to be responsive to the pressure in the control pressure passage and including a first valve part responsive to said pressure which controls the volumetric rate of escape of working fluid from the working fluid supply passage to the working fluid relief passage, and a second valve part also responsive to said pressure which controls the volumetric rate of flow of fluid through the working fluid outlet passage, said valve parts being related so that the control of flow through the said outlet passage by the said second valve part operating in a sense opposite to that of the control of the escape of working fluid to the working fluid relief passage by the said first valve part.

4. A prime mover system as claimed in claim 1 in which said apparatus for regulating the speed thereof includes adjusting apparatus arranged to vary the setting of the control orifice device, and an operative connection between the hydraulic motor and the adjusting apparatus whereby the setting of the orifice device is automatically varied in response to the rotation of the hydraulic motor.

References Cited in the file of this patent

UNITED STATES PATENTS

| | | |
|---|---|---|
| 2,056,896 | Douglas | Oct. 6, 1936 |
| 2,492,720 | Tyler | Dec. 27, 1949 |
| 2,604,756 | Greenland | July 29, 1952 |
| 2,633,830 | McCourty et al. | Apr. 7, 1953 |
| 2,660,985 | Ernst | Dec. 1, 1953 |

FOREIGN PATENTS

| | | |
|---|---|---|
| 232,349 | Great Britain | Apr. 23, 1925 |